UNITED STATES PATENT OFFICE.

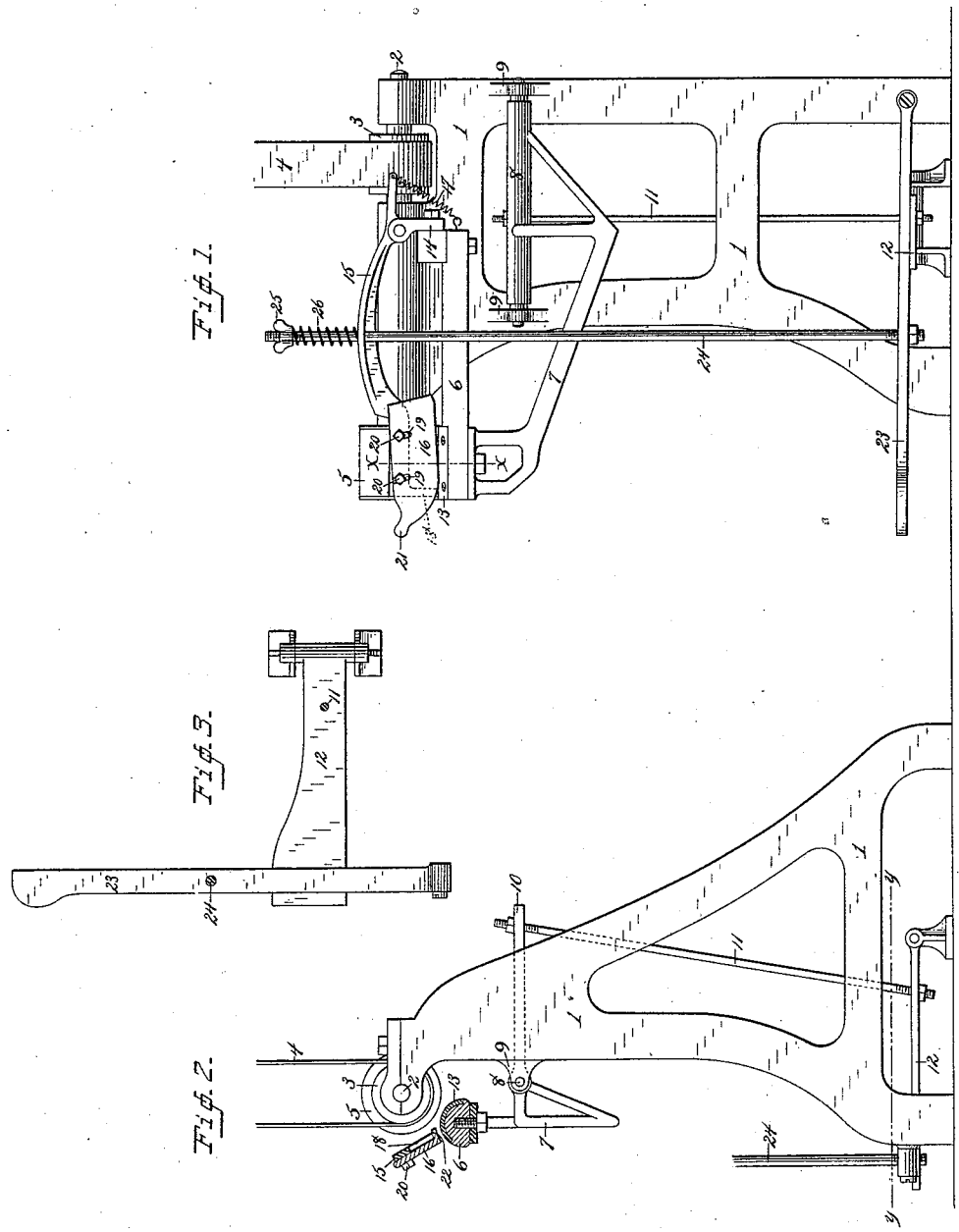

D. GAYLORD MURPHY, OF FISHKILL-ON-THE-HUDSON, NEW YORK, AND FRANK J. MURPHY, OF DANBURY, CONNECTICUT.

HAT-POUNCING MACHINE.

SPECIFICATION forming part of Letters Patent No. 350,375, dated October 5, 1886.

Application filed April 14, 1886. Serial No. 198,798. (No model.)

*To all whom it may concern:*

Be it known that we, D. GAYLORD MURPHY, residing at Fishkill-on-the-Hudson, in the county of Dutchess and State of New York, and FRANK J. MURPHY, residing at Danbury, in the county of Fairfield and State of Connecticut, citizens of the United States, have invented certain new and useful Improvements in Hat-Pouncing Machines; and we do hereby declare the following to be a full, clear, and exact description of the invention, such as will enable others skilled in the art to which it appertains to make and use the same.

Our invention has for its object to so improve the construction of this class of machines that the capacity shall be largely increased, and the tendency to throw hats out shall be entirely overcome, while at the same time the machine, as improved, is much more easily controlled by the operator.

With these ends in view we have devised the improvements which we will describe, referring by numbers to the accompanying drawings, forming part of this specification, in which—

Figure 1 is a front elevation of a hat-pouncing machine with our improvements applied. Fig. 2 is an end elevation thereof, the rest, guide, &c., being in section on the line $x\,x$ in Fig. 1; and Fig. 3 is a detail section on the line $y\,y$ in Fig. 2.

1 indicates frame-work; 2, the shaft; 3, the driving-pulley; 4, the belt, and 5, the pouncing-roller. All these parts are of ordinary construction, the pouncing-roller being covered with sand-paper in the usual manner.

In practice, we use a hood with an exhaust-tube to carry away the dust from the pouncing-roller. This, however, forms no portion of our present invention, and has been omitted for the sake of clearness in the drawings.

6 is a rest carried by an arm, 7, which projects from a rock-shaft, 8, journaled in bearings 9 upon the frame-work. An arm, 10, projects backward from the rock-shaft, and is connected by a rod, 11, with treadle 12. That portion of the face of the rest which is next to the pouncing-roller is preferably protected by a plate, 13, which is set into the rest, and which is curved to correspond therewith. The weight of the rest and of arm 7 is sufficient to keep the rest out of operative position.

14 is a standard carried at the rear of the rest, and 15 a lever pivoted in said standard. The long arm of this lever carries an adjustable guide, 16. The short end projects backward from the standard, and a spring, 17, attached thereto and to the rear end of the rest, acts to hold the guide out of operative position, a stop, (not shown,) of any suitable construction, serving to limit the vibration of the lever. The outline of the arm is indicated by dotted lines in Fig. 1.

It will be noticed that a downwardly-projecting arm, 18, is provided back of the guide, which serves as a rigid support therefor in use. The guide is provided with slots 19, through which bolts 20 pass to secure it to lever 15. At the outer end of the guide a hand rest, 21, is provided for convenience in operating the machine. At the bottom the rest is preferably provided with a wing or extension, 22, to give greater bearing-surface upon the rest, the bottom of the guide being concaved to correspond with the convex surface of the rest.

23 is a treadle extending transversely to treadle 12, and resting thereon. A rod, 24, projects upward from this treadle, and passes through a hole in lever 15. The upper end of this rod is threaded, and is provided with a thumb-screw, 25.

26 is a spring which bears upon the top of lever 15, and may be adjusted by thumb-screw 25. It will be noticed in Fig. 1 that the guide is so adjusted that the lower edge is not exactly parallel with the surface of the rest, the outer end of the guide being the lowest. By setting the guide in this manner we insure that the action of the pouncing-wheel will be to draw the hat inward rather than to throw it out, as is the tendency with the old-style machines. The guide of course requires to be differently adjusted for different qualities and thicknesses of hats. Heretofore in this style of machines the rest has been raised by pressing down the treadle. This is very inconvenient for the operator, for the reason that in using the machine he has to sit well around to the left as the machine stands in Fig. 1. By the addition of treadle 23, which lies over and across treadle 12, we remedy this objection and enable the operator to control the position of the rest without inconvenience. At the same time that the rest is raised, the guide is also pressed downward and inward against the rest, thus relieving the operator from the necessity of guiding the hats entirely by hand when the machine is in use. We have found in practice when the guide is accurately adjusted that hats may be perfectly guided while being pounced by the action of treadle 23, and without the use of either hand, the angle at which the guide is set tending to draw the hats inward. For the convenience of the operator, however, we have provided hand-rest 21, so that the action of the guide may be perfectly controlled by hand, if desired. When greater pressure is desired upon the rest, it is simply necessary to turn down set screw 25, thereby compressing spring 26.

The operation of the machine is the same as usual in machines of this class. The operator sits in front of the pouncing-roller and places the edge of the hat upon the rest just under the lowest portion of the guide. He then presses down upon treadle 23, which raises the rest upward and throws the hat against the pouncing-roller. At the same instant the guide is drawn down upon the hat, thus holding it firmly in position. The pouncing-roller is rotated at a very high rate of speed from right to left, as seen in Fig. 2, the hat being drawn forward by the friction of the wheel, and at the same time drawn inward owing to the peculiar adjustment of the guide, the action of the machine in pouncing being from the brim inward toward the tip. Should it become necessary to alter the position of the rest relatively to the pouncing-roller, this may readily be accomplished by turning one or both of the nuts at the ends of treadle-rod 11.

We do not desire to limit ourselves to the exact details of construction shown and described, as they may obviously be varied widely without departing from the spirit of our invention.

We claim—

1. The combination, with the pouncing-roller and rest, and the arm, rock-shaft, rod 11, and treadle 12, by which it is controlled, of a pivoted lever, 15, guide 16, treadle 23, and rod 24, as described, and for the purpose set forth.

2. In a hat-pouncing machine, the combination, with the rest and mechanism for controlling it, as treadle 12, the rock-shaft, &c., of treadle 23, extending across treadle 12 and resting thereon, whereby the rest may be controlled while the operator sits at the end of the machine.

3. In a hat-pouncing machine, the rest having standard 14 and lever 15 pivoted therein, in combination with guide 16, adjustably secured to said lever.

4. The rest having standard 14 and lever 15 pivoted in said standard, and having arm 18, in combination with a guide having slots 19 and extensions 22 and bolts 20, by which it is secured to the lever at any desired angle.

5. The pivoted lever and the adjustable guide secured thereto, in combination with treadle 23, rod 24, passing through the lever, spring 26, bearing thereon, and a thumb-screw for regulating the pressure of the spring upon the lever.

6. The pivoted lever, the adjustable guide secured thereto, and the rest, in combination with treadle 12 and connections, and treadle 23, whose rod 24 engages the pivoted lever, whereby the rest may be raised and the guide lowered by pressing on treadle 23.

7. Treadles 12 and 23 and connections, in combination with the rest, pivoted lever, adjustable guide, and springs 17 and 26, combined as described, and for the purpose set forth.

In testimony whereof we affix our signatures in presence of two witnesses.

D. GAYLORD MURPHY.
FRANK J. MURPHY.

Witnesses as to signature of D. Gaylord Murphy:
 JNO. G. MURPHY,
 CHAS. W. BRUNDAGE.

Witnesses as to signature of Frank J. Murphy:
 A. M. WOOSTER,
 C. E. RUGGLES.